(12) United States Patent
Miwa et al.

(10) Patent No.: US 6,230,558 B1
(45) Date of Patent: May 15, 2001

(54) APPARATUS AND METHOD FOR MEASURING FUEL FLOW RATE AND RESIDUAL FUEL QUANTITY AND FOR CONTROLLING EVAPORATED FUEL

(75) Inventors: Makoto Miwa; Shigenori Isomura, both of Kariya; Toshihiko Muramatsu, Chiryu; Kazuji Managawa, Tokoname; Takeshi Matsuda, Anjo; Takahiko Kato, Chiryu, all of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/075,942

(22) Filed: May 12, 1998

(30) Foreign Application Priority Data

| May 12, 1997 | (JP) | ........................................ 9-120686 |
| Sep. 12, 1997 | (JP) | ........................................ 9-248364 |
| Apr. 9, 1998 | (JP) | ........................................ 10-097303 |

(51) Int. Cl.$^7$ .................................................. G01F 9/00
(52) U.S. Cl. .................... 73/201; 73/118.1; 73/861.89
(58) Field of Search ................................. 73/116, 117.2, 73/117.3, 118.1, 118.2, 119 A, 861.86, 198, 201, 861.77, 861.79, 861.89

(56) References Cited

U.S. PATENT DOCUMENTS

| 4,491,026 | * | 1/1985 | Bräutigam et al. ............... 73/861.86 |
| 4,793,311 | * | 12/1988 | Salzgeber et al. .................... 123/450 |
| 5,233,944 | * | 8/1993 | Mochizuki ........................... 123/1 A |
| 5,596,971 | | 1/1997 | Kidokoro .............................. 123/516 |
| 5,740,783 | * | 4/1998 | Learman et al. ...................... 123/497 |

FOREIGN PATENT DOCUMENTS

| 58-122433 | 7/1983 | (JP) . |
| 60-158922 | 10/1985 | (JP) . |
| 60-235023 | 11/1985 | (JP) . |
| 63-25517 | 2/1988 | (JP) . |
| 7-290982 | 11/1995 | (JP) . |
| 9-138176 | 5/1997 | (JP) . |

* cited by examiner

*Primary Examiner*—George Dombroske
(74) *Attorney, Agent, or Firm*—Nixon & Vanderhye PC

(57) ABSTRACT

A residual fuel quantity measuring device for automobiles has a fuel flow rate sensor provided in a filler neck of a fuel tank for measuring the flow rate of liquid fuel supplied to a fuel tank. A computer computes the quantity of liquid fuel remaining in the fuel tank from a previously stored residual quantity of liquid fuel, the measured fuel flow rate, the injection rate of fuel from fuel injection valves, and the purge quantity of fuel evaporated in the fuel tank. A fuel meter visually displays the thus computed residual quantity of liquid fuel in the fuel tank.

21 Claims, 9 Drawing Sheets

US 6,230,558 B1

APPARATUS AND METHOD FOR MEASURING FUEL FLOW RATE AND RESIDUAL FUEL QUANTITY AND FOR CONTROLLING EVAPORATED FUEL

CROSS REFERENCE TO RELATED APPLICATION

This application relates to and incorporates herein by reference Japanese Patent Applications No. 09-120686 filed on May 12, 1997, 09-248364 filed on Sep. 12, 1997 and 10-97303 filed on Apr. 9, 1998.

BACKGROUND OF THE INVENTION

1. Field of the Invention

The present invention relates to a fuel flow rate measuring device and method for measuring the flow rate of liquid fuel passing in a fuel supply inlet passage of a fuel tank, and an evaporated fuel treating device and method using the fuel flow rate measuring device. More particularly, the invention relates to a residual fuel quantity measuring device and method for determining the quantity of liquid fuel remaining in the fuel tank by measuring the quantity of liquid fuel supplied into the fuel tank and the rate of injection of liquid fuel into an internal combustion engine.

2. Description of Related Art

In automobiles mounted with a conventional gasoline engine, as shown in FIG. 14, at least one fuel pump 105 is disposed in a fuel tank 101 for forcing a liquid fluid (e.g., gasoline) from the fuel tank 101 to a fuel distribution pipe 104 having a plurality of fuel injection valves 103 for injecting the liquid fuel to the engine 102. In the plurality of fuel injection valves 103 and the fuel pump 105, the liquid fuel supply pressure, injection rate, and injection timing are automatically controlled by an engine ECU 106 in accordance with the operating conditions of the engine 102.

It has been a general practice that an automobile driver knows the remaining quantity of liquid fuel in the fuel tank 101 by a fuel meter 111 as a visual display which registers the remaining quantity of liquid fuel measured by a residual fuel quantity measuring device 100. The residual fuel quantity measuring device 100 is provided with at least one level gauge 107. The fuel meter 111 registers the residual quantity of liquid fuel according to an electric signal from the level gauge 107. A slide resistor of the level gauge 107 is connected via a float arm 109 with a float 108 which moves with a changing fuel level in the fuel tank 101, thus indicating a change in the electrical resistance value with the movement of the float 108.

The fuel tank 101, however, tends to be shaped in a more flattened and more complicated configuration as shown in FIG. 14 because of a restricted mounting space in the automobile. Consequently, a conventional residual fuel quantity measuring device 100, has a very low measuring accuracy in measuring the residual amount of liquid fuel remaining in the fuel tank 101 as compared with a measuring device for measuring the residual amount of liquid fuel in a fuel tank of a simple configuration.

The fuel tank in the complicated configuration, moreover, needs at least two level gauges 107 in the fuel tank 101 as shown in FIG. 14. Furthermore, such a fuel tank 101 of intricate configuration needs to further increase the number of the level gauges 107, resulting in an increased number of component parts of the residual fuel quantity measuring device 100 and accordingly a higher manufacturing cost of the residual fuel quantity measuring device 100.

When the fuel tank 101 is built in a more flattened or complicated configuration, it will become very hard to mount the level gauge 107 in the fuel tank 101, making it impossible to measure the remaining amount of liquid fuel in the fuel tank.

Also for the gasoline-powered automobile, there has been proposed the use of an evaporated fuel treating device (e.g., Japanese Utility Model Laid-Open No. Sho 60-158922, and Japanese Patent Laid-Open Nos. Hei 8-170568 and Hei 7-290982) for preventing the discharge into the atmosphere of the fuel evaporated in the fuel tank.

According to Japanese Utility Model Laid-Open No. Sho 60-158922 and Japanese Patent Laid-Open No. Hei 8-170568, the amount of evaporated fuel generated is restricted by covering, with a bag-like expansion film, the fuel in the fuel tank and a separation film which is in tight contact with the fuel surface in the fuel tank and moves up and down with the movement of the fuel surface.

In the evaporated fuel treating device having the separation film or bag-like expansion film, it is necessary to make a mounting hole for mounting the level gauge inside of the expansible film larger and accordingly it is necessary to make a sealing portion larger. However, if the sealing portion is made larger, sealing properties will be deteriorated to lower the effect of restraining the generated amount of evaporated fuel.

Furthermore, according to Japanese Patent Laid-Open No. Hei 7-290982, an electromagnetic valve is provided in a pipe connecting the fuel tank and a canister so that the valve opens at the time of refilling the fuel and the evaporated fuel in the tank is adsorbed by the canister.

SUMMARY OF THE INVENTION

It is a first object of the present invention to provide a fuel flow rate measuring device and method which is capable of measuring liquid fuel fed into a fuel tank.

It is a second object of the present invention to provide a residual fuel quantity measuring device and method which is capable of measuring the residual quantity of liquid fuel even in a fuel tank of flattened or complicated configuration without using a sensor such as a level gauge for detecting surface level changes of liquid fuel.

Further, it is a third object of the present invention to provide an evaporated fuel treating device and method which is capable of accurately checking whether the fuel is being supplied, without using a special sensor, to thereby prevent discharge of evaporated fuel out to the atmosphere during fuel supply.

According to the present invention, the quantity of liquid fuel to be supplied into the fuel tank is measured, and the residual quantity of liquid fuel remaining in the fuel tank is measured by utilizing the quantity of liquid fuel. Furthermore, the measurement is also made on the way of the fuel supply inlet passage of the fuel tank, thereby improving the accuracy of measuring the quantity of fuel to be supplied into the fuel tank. When the liquid fuel is supplied into the fuel tank, a liquid fuel stream runs in the fuel supply inlet passage of the fuel tank. Then, the rotational speed of the turbine rotor rotating in accordance with the flow rate of the liquid fuel flowing in the fuel supply inlet passage is detected. Thus the quantity of liquid fuel supplied into the fuel tank is determined from the detected rotational speed of the turbine rotor and the unit time.

The residual quantity of liquid fuel remaining in the fuel tank is preferably determined from the residual quantity of liquid fuel, the quantity of liquid fuel supplied, and the injection rate of the liquid fuel.

When the rotational speed of the turbine rotor exceeds a specific value, it is preferably determined that the liquid fuel is being supplied into the fuel tank. When this determination has been made, the open/close valve is opened to send evaporated fuel from the fuel tank into a canister. The canister in which the fuel is adsorbed, preventing the discharge of evaporated fuel to the atmosphere at the time of fuel supply. Furthermore, it is possible to check fuel supply by a fuel meter which is a peripheral device of the fuel tank, without adding any special sensor.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENTS

Figure 1:
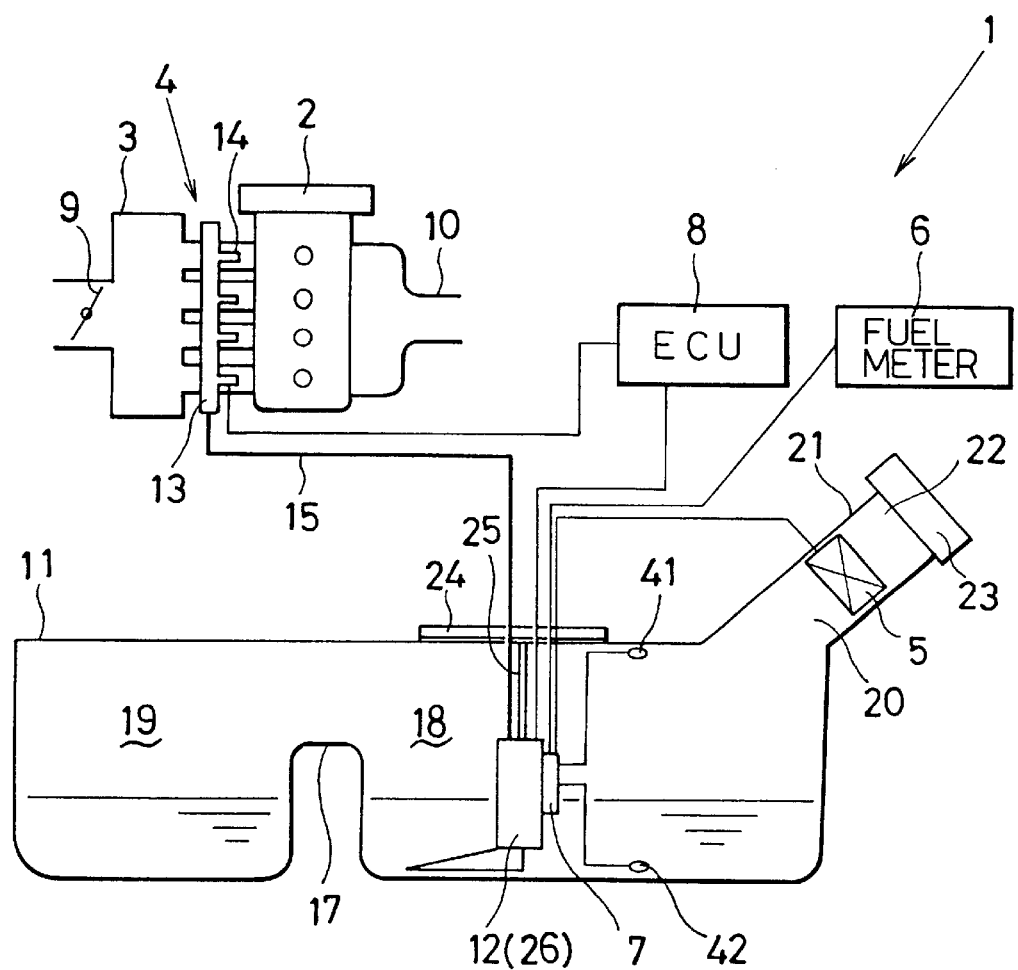
FIG. 1 is a block diagram of a fuel supply system of an automobile (first embodiment)

Preferred embodiments of the present invention will be explained with reference to the accompanying drawings, in which the same or similar parts are designated by the same or similar reference numerals throughout the embodiments.

First Embodiment

In a first embodiment shown in FIGS. 1 to 6, a residual fuel quantity measuring device 1 for an automobile is associated with a fuel injection device 4 for injecting the liquid fuel (e.g., a high-volatility fuel such as gasoline) into an intake manifold 3 of a gasoline engine 2. The residual fuel quantity measuring device 1 is provided with a fuel flow rate quantity sensor 5 for measuring the quantity of the liquid fuel to be supplied to the automobile, a residual fuel quantity meter 6 for registering the residual quantity of the liquid fuel, and a control circuit 7 for measuring the residual quantity of the liquid fuel in accordance with a signal outputted from the fuel flow rate quantity sensor 5 and operating the fuel meter 6.

The engine 2 having an intake manifold 3 and an exhaust manifold 10 is mounted within an engine compartment located at the front in the direction of travel of the automobile. In the intake manifold 3 of the engine 2 is mounted a throttle valve 9 which opens and closes in interlock with an accelerator pedal.

A fuel injection device 4 mounted on the engine 2 is comprised of a fuel tank 11 for storing liquid fuel, a fuel pump 12 for pumping the liquid fuel out from the fuel tank 11 to the intake manifold 3, a fuel distribution pipe 13 disposed in the intake manifold 3 of the engine 2, a plurality of fuel injection valves (injectors) 14 fitted in the fuel distribution pipe 13, and a fuel pipe 15 which forms a fuel passage connecting the fuel pump 12 with the fuel distribution pipe 13. The fuel pump 12 and each fuel injection valve 14 are electronically controlled by an engine electronic control unit (engine ECU) 8.

The fuel tank 11 is mounted below the rear seat of the automobile. The interior of the fuel tank 11 is separated into two storage chambers 18 and 19 by a partition portion 17. On the side of the fuel tank 11, an approximately round tube-shaped filler neck 21 forming the fuel supply inlet passage 20 inside extends obliquely upwardly from the storage chamber 18. At the end of the filler neck 21 is formed a fuel filler port 22 for filling the liquid fuel to the fuel tank 11. The fuel filler port 22 is closed after filling the fuel by tightening a filler cap 23 into the filler neck 21.

In the ceiling portion of the fuel tank 11 a purge hole (not shown) is formed for leading evaporated fuel (evaporation gas) from the fuel tank 11 into the intake manifold 3 of the engine 2 through a fuel anti-evaporation device (not shown). In a purge gas passage (not shown) of the fuel anti-evaporation device a canister (not shown) is mounted in which an adsorbing agent (e.g., activated charcoal) for adsorbing the fuel vapor. Also on the way of the purge gas passage connecting the intake manifold 3 of the engine 2 with the canister, a purge control valve (not shown) is also mounted for controlling the purge flow rate of the fuel vapor according to the intake manifold vacuum of the engine 2.

The fuel pump 12 is comprised of a support plate 24 attached to the ceiling portion of the fuel tank 11, a support member 25 suspended from the support plate 24, and a pump body 26 suspended in the storage chamber 18 by the support member 25. The pump body 26 functions to force the liquid fuel drawn up from the fuel tank 11 to the fuel distribution pipe 13. The pump body is driven by an electric actuator, such as an electric motor, the electric voltage of which is controlled by the engine ECU 8.

The fuel distribution pipe 13 serves to distribute the liquid fuel forced from the fuel pump 12, to each fuel injection valve 14. A return (not shown) is connected to the fuel distribution pipe 13 is connected a through which the liquid fuel not used at each fuel injection valve 14 is returned to the fuel tank 11. The fuel injection valve 14 is fitted in the fuel distribution pipe 13 connected to the intake manifold 3, and atomizes and directly injects the liquid fuel into the inlet port of the intake manifold 3 in accordance with an injection signal from the engine ECU 8.

Figure 2:
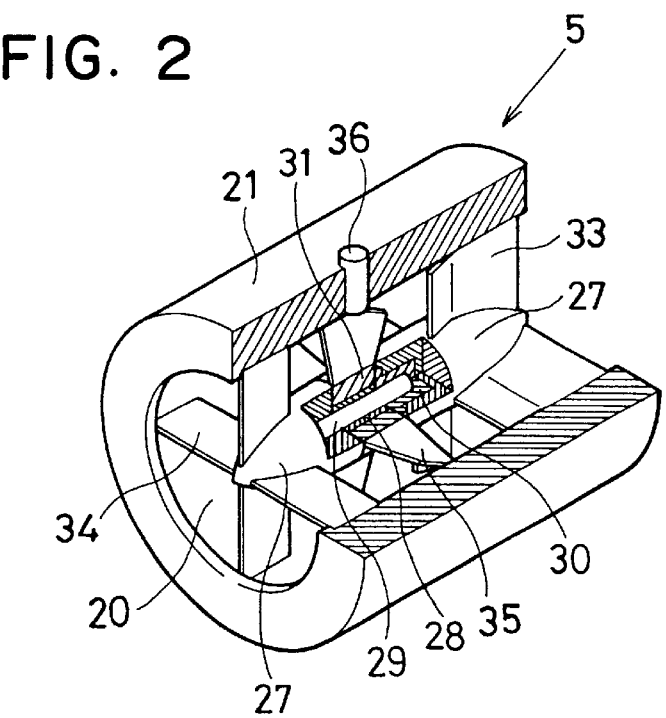
FIG. 2 is a perspective view showing a fuel flow rate quantity sensor (first embodiment)
Figure 3:
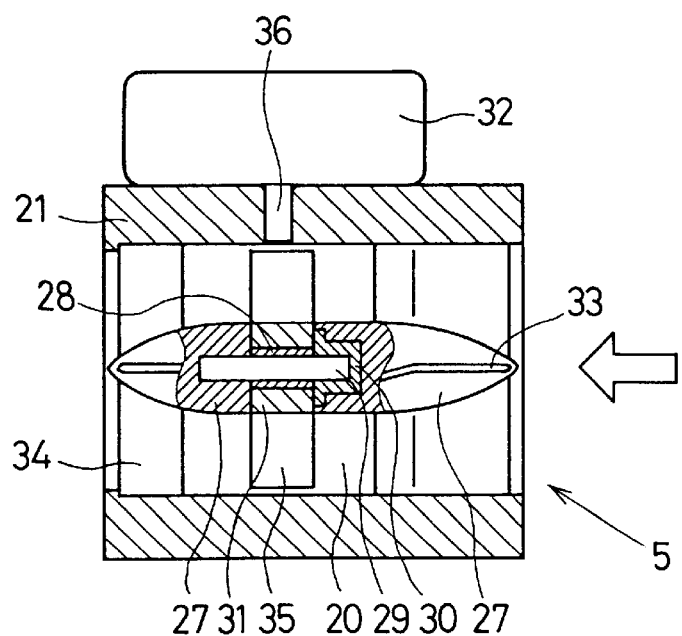
FIG. 3 is a sectional view showing the fuel flow rate quantity sensor (first embodiment)

A fuel flow rate quantity sensor 5, together with the later-described control circuit 7, constitutes a fuel flow rate quantity measuring device, particularly is a component constituting the sender portion of the automotive fuel meter. As shown in FIGS. 2 and 3, the fuel flow rate quantity sensor 5 is comprised of a turbine holder 27 mounted on the way of the filler neck 21 of the fuel tank 11, the turbine rotor 31 rotatably supported on the outer periphery of the turbine holder 27, and a rotational speed detecting circuit 32 for detecting the rotational speed of the turbine rotor 31.

The turbine holder 27 is divided into two parts of the upstream and downstream sides, which are connected by a round bar-shaped support shaft 29. A plurality of strainer vanes 33 and 34 are integrally formed on the outer periphery of both end portions of the support shaft 29. The turbine rotor 31 has a plurality of turbine blades 35 integrally formed a little inclined with respect to the direction of flow of the fuel, and freely rotates on the outer periphery of the support shaft 29 through a metal bearing 28. A guide 30 is provided to guide the support shaft 29 when the turbine rotor 31 is assembled. The turbine rotor 31 turns in accordance with the flow rate of the liquid fluid as the liquid fuel passing through in the fuel supply inlet passage 20 acts on a plurality of turbine blades 35.

The rotational speed detecting circuit 32 outputs one or a plurality of electric signals (rectangular pulse signals) per rotation of the turbine rotor 31 by the use of a pickup coil 36 which is secured on the filler neck 21. The rotational speed detecting circuit 32 detects the rotational speed of the turbine rotor 31 by counting the number of the electric signals. A rotational speed signal is sent from the rotational speed detecting circuit 32 to the control circuit 7.

Figure 4:
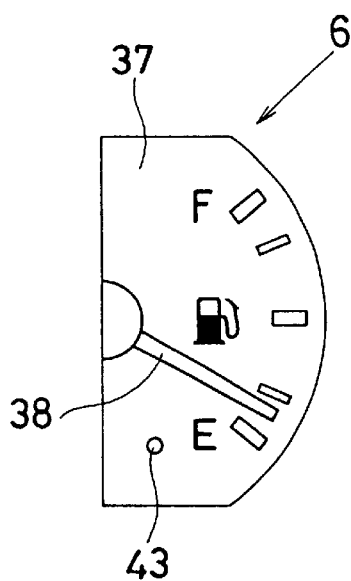
FIG. 4 is a plan view showing a fuel meter of the automobile (first embodiment)
Figure 5:
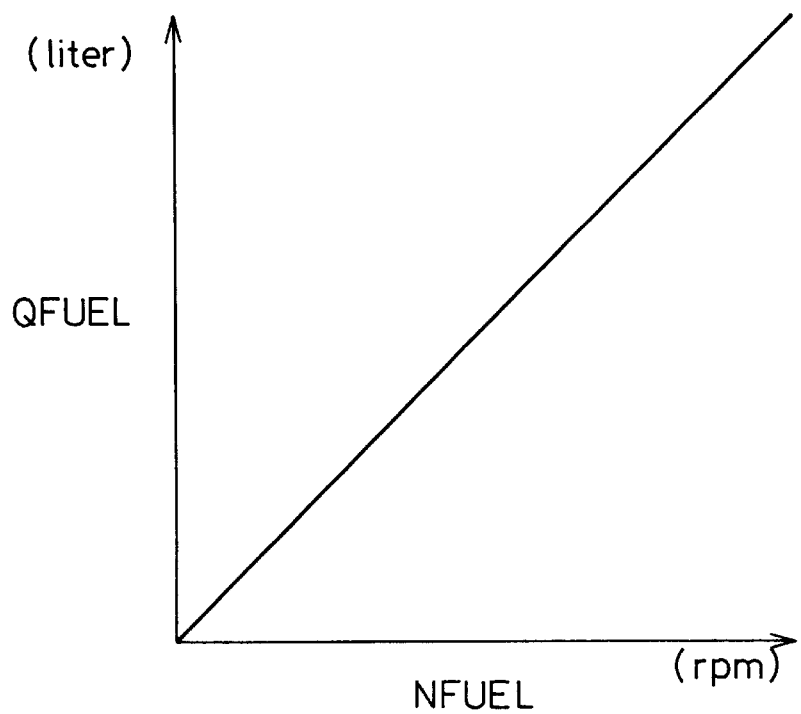
FIG. 5 is a characteristics diagram showing a relation between the rotational speed of the turbine rotor and the quantity of fuel flow rate (first embodiment)

Fuel meter 6 shown in FIGS. 1 and 4 is a residual fuel Jo0 quantity indicating device, and particularly an analog meter constituting a receiver section of the automotive fuel meter. The fuel meter 6 is a visual display which, with the design of a dial plate 37 attached on the instrument panel of the automobile, visually registers the residual amount of liquid fuel remaining in the fuel tank 11. To indicate the residual amount of the liquid fuel, a cross coil-type indicator (not shown) is operated by a driving signal from the control circuit 7, to thereby turn a pointer 38 to a position where the pointer 38 stops and registers the residual amount of the liquid fuel.

The control circuit 7 is an electronic circuit for the residual fuel measuring system. The control circuit 7 itself is a microcomputer incorporating built-in CPU, ROM, RAM and timer circuit.

The control circuit 7 is mounted, for instance, on the pump body 26 of the fuel pump 12, and is operated with the power being supplied from a battery. Furthermore, the control circuit 7 functions to measure the quantity of the liquid fuel supplied to the fuel tank 11 in accordance with a rotational speed signal inputted from the fuel flow rate quantity sensor 5, electric signals inputted from a FULL TANK switch 41 and an EMPTY switch 42, and the characteristics diagram given in FIG. 5. The control circuit 7 functions also to transmit to the engine ECU 8 a signal to drive the fuel meter 6 according to a control program pre-stored in the ROM.

The FULL TANK switch 41 is an upper limit residual quantity detecting device. This switch outputs an electric signal when the quantity of the liquid fuel remaining in the fuel tank 11 exceeds the upper limit value (FULL TANK, e.g., 601). A thermistor is used as the FULL TANK switch 41; when the fuel tank 11 is full of fuel, the thermistor comes under the surface of the liquid fuel, and accordingly the thermistor temperature drops, resulting in an increased electric resistance of the thermistor. Therefore, at the time of liquid fuel supply to the fuel tank 11, the increased electrical resistance of the thermistor is detected, indicating that the fuel tank 11 is full of the residual amount of the liquid fuel.

The EMPTY switch 42 is a lower limit residual quantity detecting device which outputs an electric signal when the liquid fuel remaining in the fuel tank 11 is below the lower limit value (e.g., 51). A thermistor is used as the EMPTY switch 42; when the liquid fuel in the fuel tank 11 goes downwardly below the lower limit value, the thermistor appears out of the liquid fuel to rise in temperature, resulting in a decreased electrical resistance of the thermistor. Therefore, a decrease in the electrical resistance of the thermistor is first detected after the supply of the liquid fuel, allowing to detect that the residual liquid fuel in the fuel tank has decreased below the lower limit value. With the decrease of the electric resistance value of the thermistor, the current flowing in the electric circuit increases, turning on a lamp 43 of the fuel meter 6 shown in FIG. 4.

The engine ECU 8 is an electronic circuit for an engine control system and a meter control system for the computer control of the engine 2 and the fuel meter 6, and is itself a microcomputer incorporating CPU, ROM, RAM, and timer circuit. The engine ECU 8 receives detection signals from an engine speed sensor, car speed sensor, throttle opening sensor, intake air quantity sensor, coolant temperature sensor, and oxygen sensor, for detecting the operating conditions of the engine 2, and a fuel meter driving signal from the control circuit 7.

Furthermore, the engine ECU 8 performs such controls of the engine 2 as idle-speed control, fuel injection rate control, fuel injection timing control, air-fuel ratio control, air-fuel ratio feedback control, and ignition timing control, in accordance with detection signals inputted from those sensors, a driving signal inputted from the control circuit 7, and a control program pre-stored in the ROM.

Figure 6:
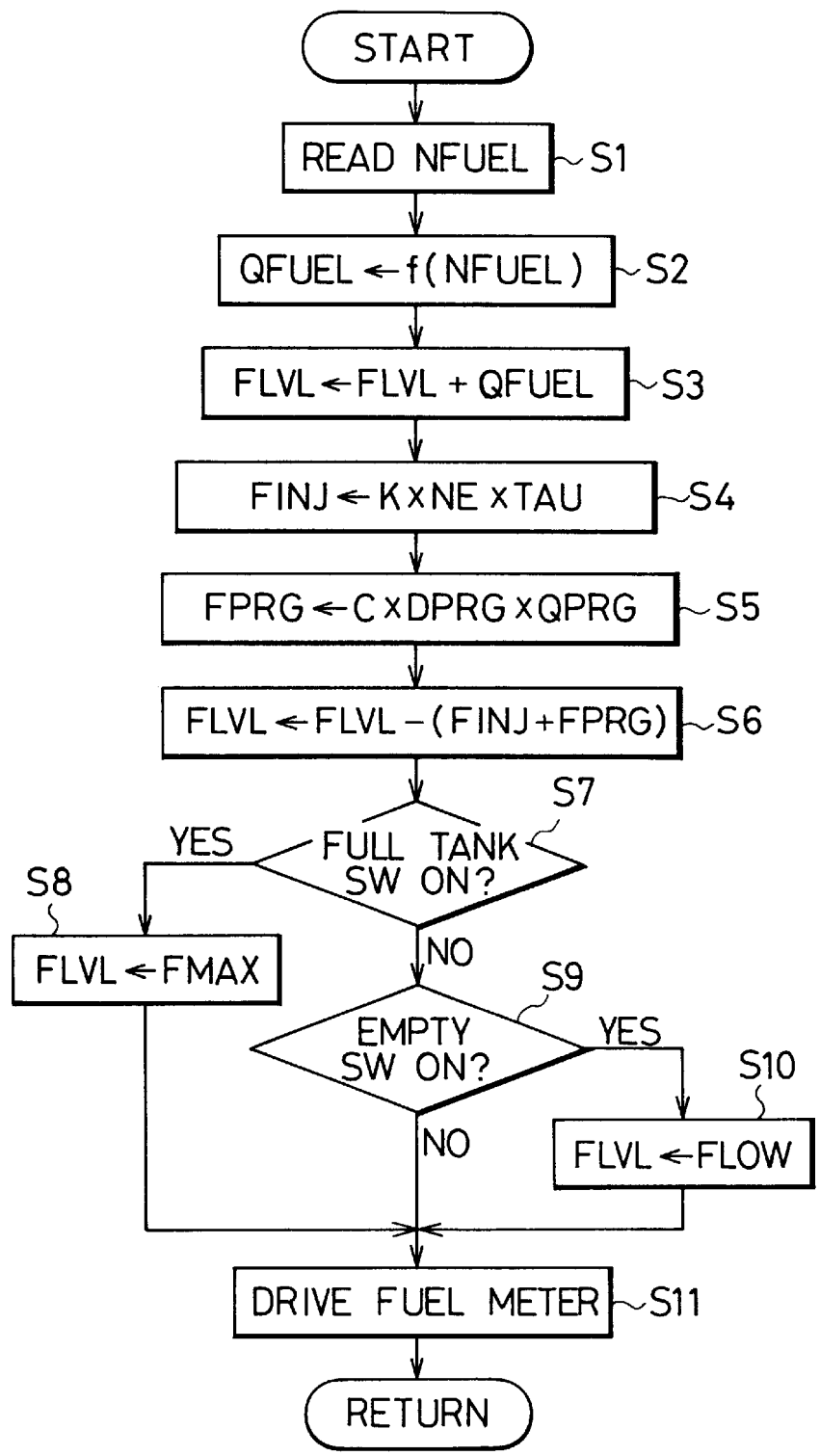
FIG. 6 is a flowchart for measuring the residual quantity of fuel by a control circuit (first embodiment)

The residual fuel quantity measuring is performed as shown in FIG. 6, in which the measurement is made every predetermined time (e.g., 0.5 second to 2 seconds).

First, a speed signal (NFUEL) of the turbine rotor 31 from the speed detecting circuit 32 of the fuel flow rate quantity sensor 5 is read in (Step S1). Subsequently, the quantity of the liquid fuel (QFUEL) supplied to the fuel tank 11 is computed by the characteristics function shown in FIG. 5 in accordance with the turbine rotor speed (NFUEL). Specifically, the quantity of the liquid fuel (QFUEL) supplied to the fuel tank 11 is computed from the turbine rotor speed (NFUEL) and the unit time (the fuel flow rate quantity measurement: Step S2).

Next, the residual quantity of the liquid fuel (FLVL) is computed by the following equation 1. That is, the total amount of the liquid fuel (FLVL) remaining in the fuel tank 11 stored in the RAM and the liquid fuel (QFUEL) computed at Step S2 is the residual quantity of the liquid fuel (FLVL) to be obtained and the stored value is updated (Step S3).

$$FLVL = FLVL + QFUEL \qquad [\text{Eq. 1}]$$

Next, the injection rate (FINJ) of the liquid fuel to be injected into the intake manifold 3 from the plurality of fuel injection valves 14 is computed (first residual fuel quantity calculation: Step S4) by the following equation 2. The liquid fuel injection rate may be determined by measuring an actual injection rate by using a sensor or by computing the air-fuel ratio.

$$FINJ = K \times NE \times TAU \qquad [\text{Eq. 2}]$$

where NE is an engine speed, TAU is an injection pulse period, and K is a conversion factor.

The liquid fuel remaining in the fuel tank 11 evaporates into fuel vapor with a temperature rise of the fuel tank 11. Then, the quantity of the fuel vapor purge gas (FPRG) generated in the fuel tank 11 and purged into the intake manifold 3 under a vacuum built up in the intake manifold is computed by the following equation 3 (Step S5). The quantity of purge gas of the fuel vapor may be determined by measuring an actual quantity of purge gas by a sensor.

$$FPRG = C \times DPRG \times QPRG \qquad [\text{Eq. 3}]$$

where DPRG is fuel vapor concentration (purge gas concentration), QPRG is the quantity of purge gas from the liquid fuel, and C is a conversion factor.

Next, the residual quantity of the liquid fuel (FLVL) is calculated by the following equation 4. That is, the result of subtraction of the liquid fuel injection rate (FINJ) determined at Step S4 and the quantity of fuel vapor purge gas (FPRG) calculated at Step S5 from the residual quantity of the liquid fuel (FLVL) calculated at Step S3 is the current residual quantity of the liquid fuel (FLVL), and a stored value is updated (second residual fuel quantity calculation: Step S6). The computation at Step S3 and the computation at Step S6 may be performed at one time.

$$FLVL = FLVL - (FINJ + FPRG) \qquad [\text{Eq. 4}]$$

Next, whether the FULL TANK switch 41 is ON, that is, whether the electric resistance of the thermistor has increased, is determined first (Step S7). When a result of this determination is YES, FLVL is corrected to regard the FULL TANK (FMAX: e.g., 60 liters.) as the current residual quantity of liquid fuel, and the stored value is updated (residual fuel quantity correction, and upper limit value correction: Step S8). Thereafter, operation will proceed to processing at Step S11.

Also, when the result of determination at Step S7 is NO, determination is made on whether the EMPTY switch 42 is ON, that is, whether the electric resistance value of the thermistor has decreased (Step S9). If the result of this determination is NO, a driving signal corresponding to the residual quantity of liquid fuel is outputted to the cross coil of the indicator of fuel meter 6 (Step S11), and then proceeding to RETURN.

Furthermore, when the result of determination at Step S9 is YES, FLVL is corrected to set the lower limit value (FLOW: e.g., 5 liters) as the current residual quantity of liquid fuel (FLVL), and the stored value is updated (residual fuel quantity correction, and lower limit value correction: Step S10). Thereafter the operation proceeds to the control processing at Step S11.

The residual fuel quantity measuring device 1 of the present embodiment, as shown in FIG. 1, can accurately measure the quantity of liquid fuel remaining in the fuel tank 11 by the operation processing of the control circuit 7 even if the fuel tank 11 has a complicated or flattened configuration because of a limited mounting space on the automobile. Since the quantity of liquid fluid remaining in the fuel tank 11 can be measured without the level gauge, it is possible to decrease the number of component parts of the residual fuel quantity measuring device 1, particularly the number of components of the sensor, and accordingly the price of the residual fuel quantity measuring device 1 can be lowered.

Since the quantity of liquid fuel remaining in the fuel tank 11 is determined with the quantity of fuel vapor evaporated and purged into the intake manifold 3 taken into account when computing the quantity of liquid fuel remaining in the fuel tank 11, it is possible to more accurately measure the quantity of liquid fuel remaining in the fuel tank 11. Also, since the residual quantity of liquid fuel thus measured is visually displayed on the fuel meter 6, the driver can check the quantity of the liquid fuel remaining in the fuel tank 11, and accordingly can see how far he will be able to travel.

The residual fuel quantity measuring device 1 of the present embodiment is able to automatically correct the residual quantity of liquid fuel to match the computed residual quantity of liquid fuel with FULL TANK or the lower limit value in case the FULL TANK switch 41 or the EMPTY switch 42 has operated to ON in the course of measurement of the quantity of liquid fuel remaining in the fuel tank 11. It is, therefore, possible to improve the accuracy of measuring the quantity of liquid fuel remaining in the fuel tank 11.

Second Embodiment

Figure 7:
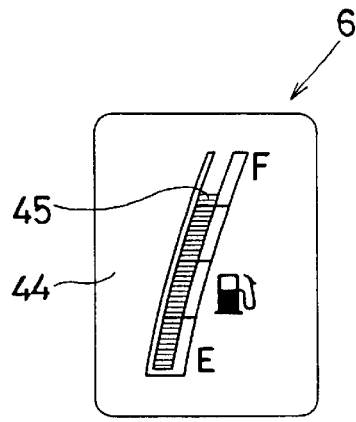
FIG. 7 is a plan view showing a fuel meter of the automobile (second embodiment)

In a second embodiment shown in FIG. 7, the fuel meter 6 is a digital meter constituting the receiver section of the fuel meter for motor vehicles. The fuel meter 6 is a visual display which visually registers the quantity of liquid fuel remaining in the fuel tank 11 by the number of activated lamps 45 on a dial plate 44 mounted on the instrument panel of an automobile.

Third Embodiment

Figure 8:
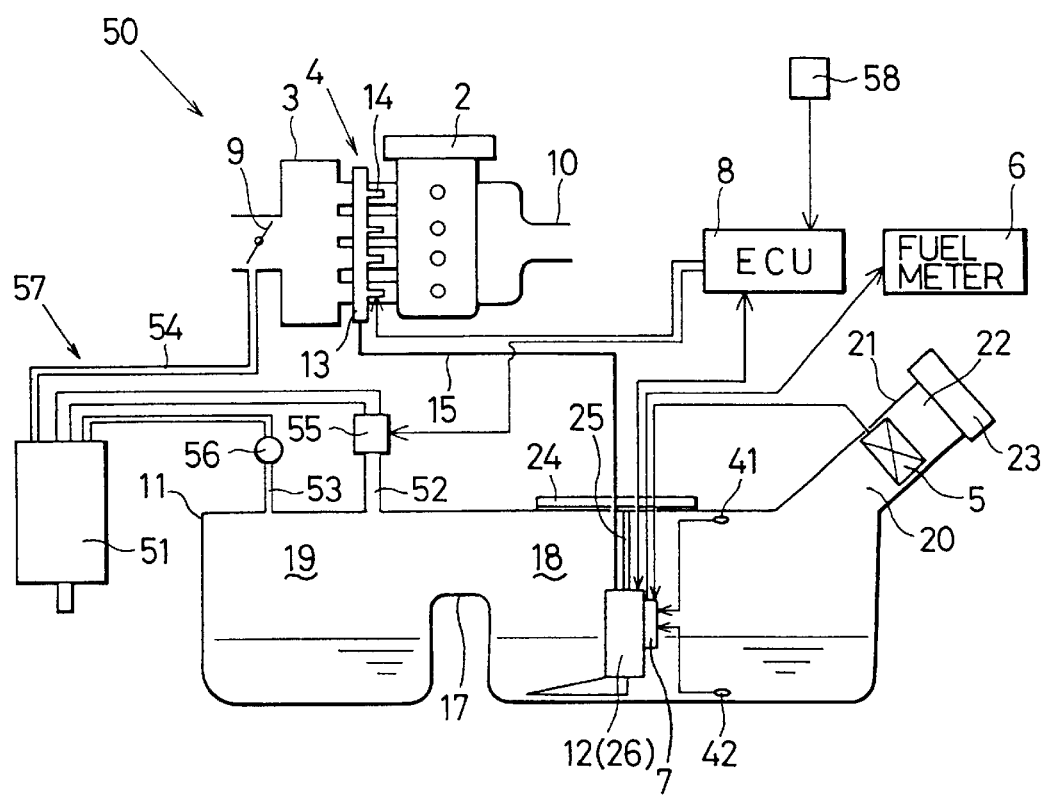
FIG. 8 is a block diagram showing an evaporated fuel treating device of the automobile (third embodiment)

In a third embodiment shown in FIG. 8, an evaporated fuel treating device 50 of an automobile is provided, in addition to the residual fuel quantity measuring device 1 of the first embodiment, with a canister 51 which adsorbs fuel vapor evaporated in the fuel tank 11, two connecting tubes 52 and 53 connecting the canister 51 with the fuel tank 11, a purge pipe 54 connecting the canister 51 with the intake manifold 3 of the engine 2, an open/close valve 55 provided in the connecting tube 52, a two-way valve 56 inserted in the connecting tube 53, and the engine ECU 8 for controlling the open/close valve 55.

The canister 51 contains adsorbent such as activated charcoal, for adsorbing the evaporated fuel. Also the canister 51 is provided with an atmospheric air vent hole (not shown) open to the atmosphere, so that the air can be drawn in. In the vent hole is fitted a canister control valve (not shown) which closes the vent hole as occasion calls. The open/close valve 55 is a pressure control valve for controlling the pressure in the fuel tank 11 by opening and closing the connecting tube 52, and uses an electromagnetically-operated solenoid valve, which opens when the current is supplied by the engine ECU 8 and closes when the current supply is stopped by the engine ECU 8.

The two-way valve 56 opens when the internal pressure of the fuel tank 11 rises above a specific value, and also opens when the internal pressure of the fuel tank 11 decreases below a specific value and below the internal pressure of the canister 51a, thus connecting the canister 51 to the fuel tank 11 through the connecting tube 53. A peripheral equipment 57 of the fuel tank is comprised of the fuel flow rate quantity sensor 5, the fuel tank 11, the canister 51, the open/close valve 55, and the two-way valve 56.

The engine ECU 8 performs the same control as in the first embodiment and determines whether the fuel supply to the fuel tank 11 is being done, in accordance with a signal outputted from the control circuit 7 and a detection signal from a speed sensor 58 for detecting the traveling speed of the automobile. The open/close valve 55 is controlled according to a result of this determination. The output signal from the control circuit 7 is a signal corresponding to the rotational speed of the turbine rotor 31 detected by the speed detecting circuit 32 of the fuel flow rate quantity sensor 5.

Figure 9:
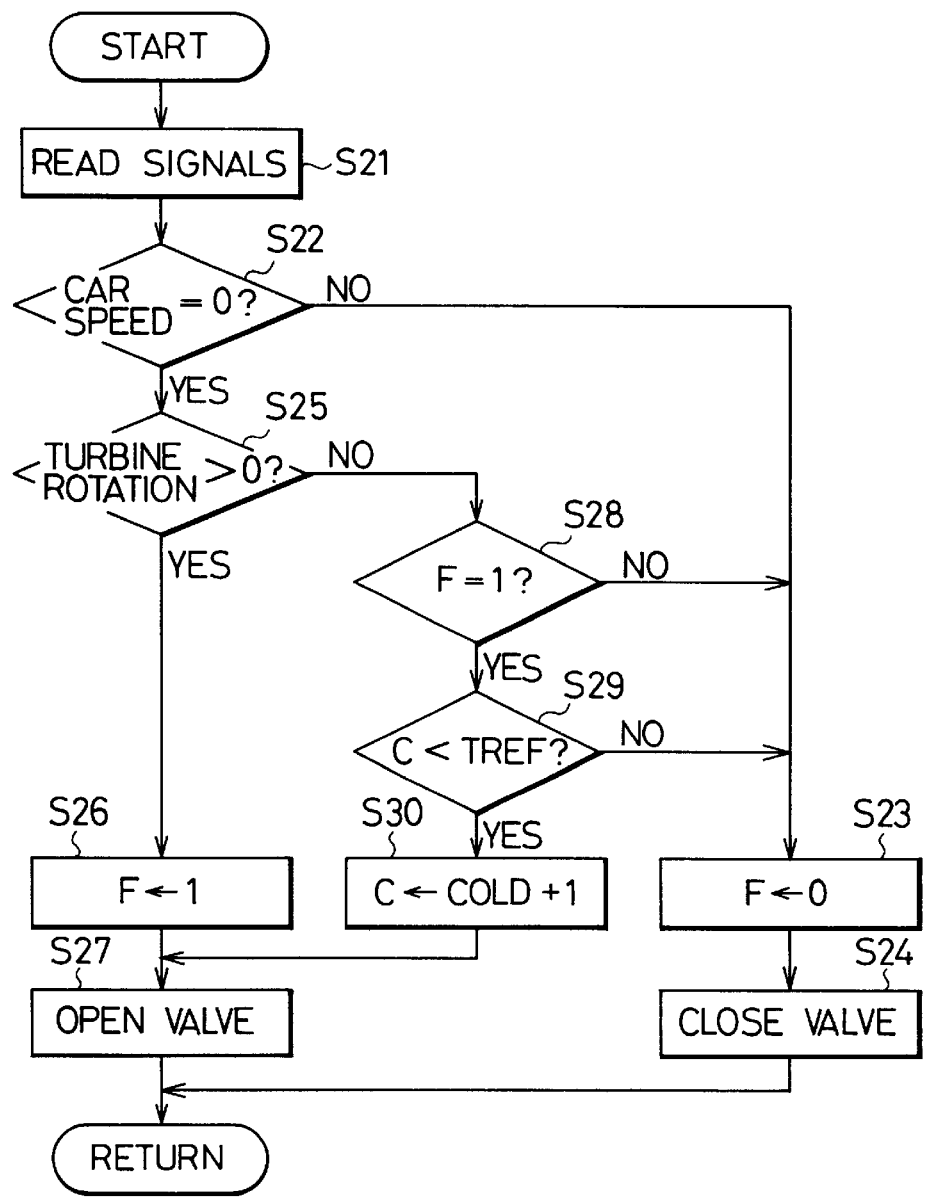
FIG. 9 is a flowchart for controlling an open/close valve control method by an engine ECU (third embodiment)

The engine ECU 8 further controls the open/close valve 55 as shown in FIG. 9. The open/close control in FIG. 9 is carried out every predetermined time (e.g., 0.5 second to 2 seconds).

First, a detection signal from the car speed sensor and an output signal from the control circuit 7 are read in. Specifically, the traveling speed of the automobile detected by the speed sensor 58 and the rotational speed of the turbine rotor 31 detected by the rotational speed detecting circuit 32 of the fuel flow rate quantity sensor 5 are read in (car speed detection and rotational speed detection: Step S21).

Next, whether the automobile traveling speed is a specific speed (e.g., 0 km/h) detected by the car speed sensor 58 is determined (Step S22). When the result of this determination is NO, the fuel flow rate flag F is reset. That is, the fuel flow rate flag F is set to zero (Step S23). The open/close valve 55 is closed to close the connecting tube 52 (Step S24), and accordingly the evaporated fuel in the fuel tank 11 will not flow into the canister 51 through the connecting tube 52.

When the result of determination is YES at Step S22, a determination is made on whether the fuel tank 11 is being supplied with the liquid fuel. Specifically, the determination is made on whether the rotational speed of the turbine rotor 31 detected by the rotational speed detecting circuit 32 exceeds the specific rotational speed (e.g., 0) (fuel flow rate determination: Step S25). When the result of this determination is YES (fuel refilling time), the fuel flow rate flag F is set. That is, the fuel flow rate flag F is set to one (Step S26). Next, the open/close valve 55 is opened to open the connecting tube 52 (Step S27), thus admitting the evaporated fuel to flow from the fuel tank 11 into the canister 51.

When the result of determination at Step S25 is NO (not fuel refilling time), whether the fuel flow rate flag F is one is checked. That is, a check is made to see whether the fuel flow rate flag F is 1 (Step S28). When the result of determination is No, operation will proceed to the processing at Step S23.

When the result of determination at Step S28 is YES, a determination is made to see whether time C counted by a timer built in the engine ECU 8 is less than a time reference TREF, e.g., 1 minute to 5 minutes (Step S29). The timer may be reset to zero at step S26 to measure the time period in which the open/close valve 55 is maintained open. When the result of determination is NO, operation will proceed to the processing at Step S23.

When the result of determination at Step S29 is YES, the time C counted by the timer will be updated. That is, the timer time COLD added with "1" (e.g., 5 seconds to 2 seconds) becomes the time C to be measured (Step S30). Thereafter, operation will proceed to the processing at Step S27.

Thus, when the rotational speed of the turbine 31 is detected by the fuel flow rate quantity sensor 5, the evaporated fuel treating device 50 determines that the liquid fuel is being supplied to the fuel tank 11, thereby opening the open/close valve 55. The evaporated fuel in the fuel tank 11, therefore, is fed into the canister 51 through the connecting tube 52 to be adsorbed by the adsorbent in the canister 51. Consequently, when the liquid fuel is supplied or refilled into the fuel tank 11, the evaporated fuel in the fuel tank 1 can be restricted from being discharged out into the atmosphere through the filler port 22 and the filler cap 23.

In the present embodiment, the open/close valve 55 is kept open until the predetermined time (e.g., 1 minute to 5 minutes) TREF is over, even if the fuel flow rate quantity sensor 5 stops detecting the rotation of the turbine rotor 31, after the determination is made that the fuel is being supplied. This is because the liquid fuel being filled in the fuel tank 11 will work as resistance to the rotation of the turbine rotor 31 if the fuel flow rate quantity sensor 5 is located relatively lower than the filler neck 21, and finally the turbine rotor 31 will stop turning and accordingly the rotational speed detected by the rotational speed detecting circuit 32 will become zero. That is, the open/close valve 55 is likely to be closed before the fuel tank 11 becomes full. Therefore, the open/close valve 55 is held open to open the connecting tube 52 until the predetermined time is over even after the rotational speed has decreased to zero.

When the rotation of the fuel flow rate quantity sensor 5 mounted in the filler neck 21 of the fuel tank 11 as a peripheral apparatus 57 of the fuel tank is detected, it can be determined that the fuel tank 11 is being supplied with the liquid fuel. Since fuel supply can be determined by the use of the fuel flow rate quantity sensor 5, without adding a special sensor, it is possible to decrease the number of component parts of a vehicle body. The FULL TANK condition can be detected by processing a signal from the FULL TANK switch 41; therefore when the open/close valve 55 is closed, the evaporated fuel in the fuel tank 11 will not be sent into the canister 51, enabling ending of fuel supply.

In the event that the fuel flow rate detecting switch is provided as a chassis side device away from the peripheral apparatus 57 of the fuel tank, whether the fuel flow rate detecting switch properly operates can be checked only after the peripheral apparatus 57 of the fuel tank is mounted on the automobile. In the present embodiment, however, the peripheral apparatus 57 of the fuel tank itself can properly check the fuel supply. Therefore, it is possible to check whether the evaporated fuel treating device 50 operates normally if the device 50 is not mounted on the automobile.

Fourth Embodiment

Figure 10:
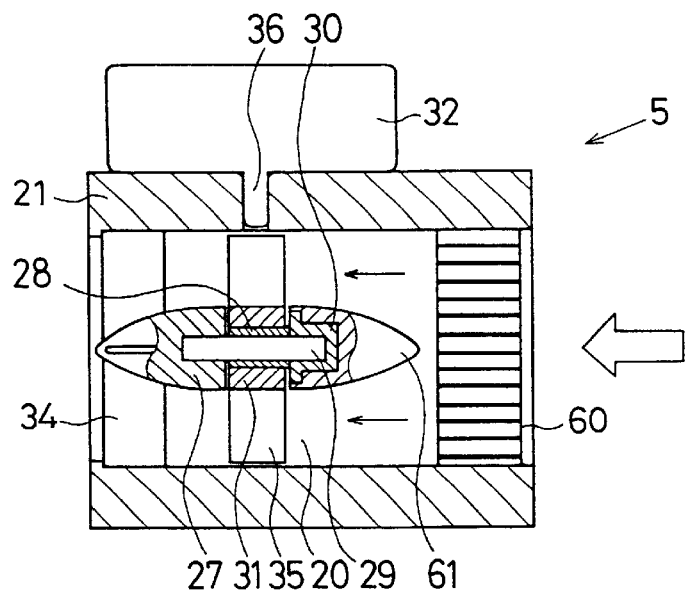
FIG. 10 is a sectional view showing a fuel flow rate quantity sensor (fourth embodiment)
Figure 11:
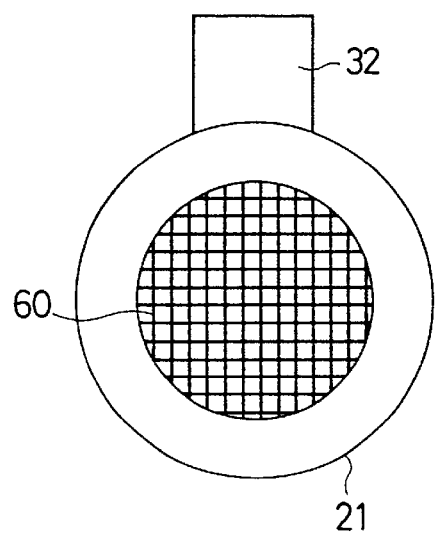
FIG. 11 is a plan view showing the fuel flow rate quantity sensor (fourth embodiment)

In a fourth embodiment shown in FIG. 10 and FIG. 11, a strainer plate 60 is mounted in the filler neck 21 on the upstream side of the fuel flow rate quantity sensor 5. The strainer plate 60 is comprised of a grid-like plate measuring 5 mm×5 mm in grid spacing, 15 mm in length in the direction of fuel flow, and 0.5 mm in plate thickness. On the upstream side of the turbine rotor 31 there is provided a streamlined strainer portion 61 for applying the liquid fuel efficiently against a plurality of turbine blades 35.

In the present embodiment, the liquid fuel supplied at the filler port 22 passes through the filler neck 21. At this time, the liquid fluid first passes through the strainer plate 60, working on the plurality of turbine blades 35 of the turbine rotor 31 and then flowing into the fuel tank 11 pass the strainer plate 34.

The plurality of turbine blades 35 are turned with the force of the liquid fluid, to thereby turn the turbine rotor 31. Then, the pickup coil 36 converts the rotational speed of the turbine rotor 31 into an electric signal in accordance with the flow rate of the liquid fluid that has passed through. Since the stream of the liquid fluid is corrected by the grid-like strainer plate 60, it is possible to gain the rotational speed of the turbine rotor 31 in accordance with the flow rate of the liquid fluid without being affected in the direction of flow of the liquid fluid.

Fifth Embodiment

Figure 12:
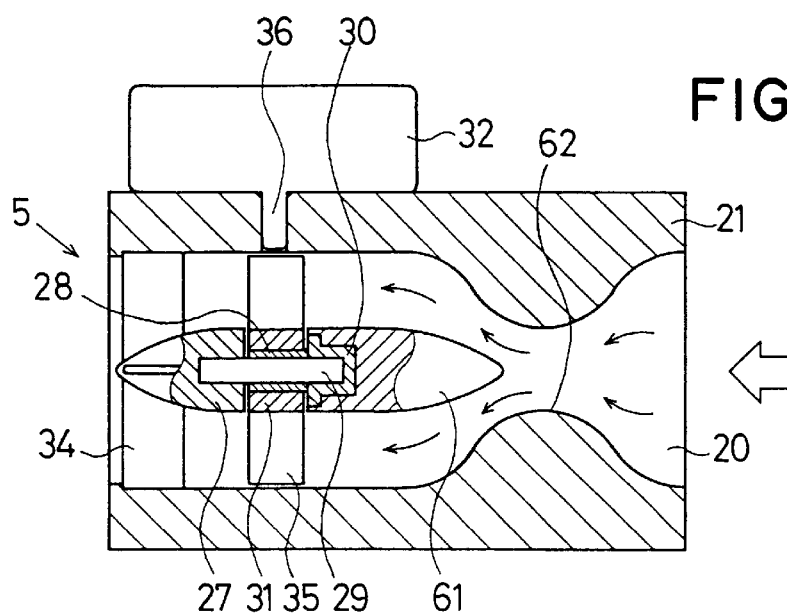
FIG. 12 is a sectional view showing the fuel flow rate quantity sensor (fifth embodiment)

In a fifth embodiment shown in FIG. 12, a throttle section 62 is located in the filler neck 21 on the upstream side of the fuel flow rate quantity sensor 5. The throttle section 62 reduces the sectional area of the fuel flow passage 20 formed in the filler neck 21.

In the present embodiment, the throttle section 62 is located on the upstream side of the turbine rotor 31. The stream of liquid fluid once hits against the throttle section 62 or the strainer portion 61, so that the deviated stream of liquid fluid will not directly hit the plurality of turbine blades 35, thereby enabling obtaining the rotational speed of the turbine rotor 31 corresponding to the flow rate.

Sixth Embodiment

Figure 13:
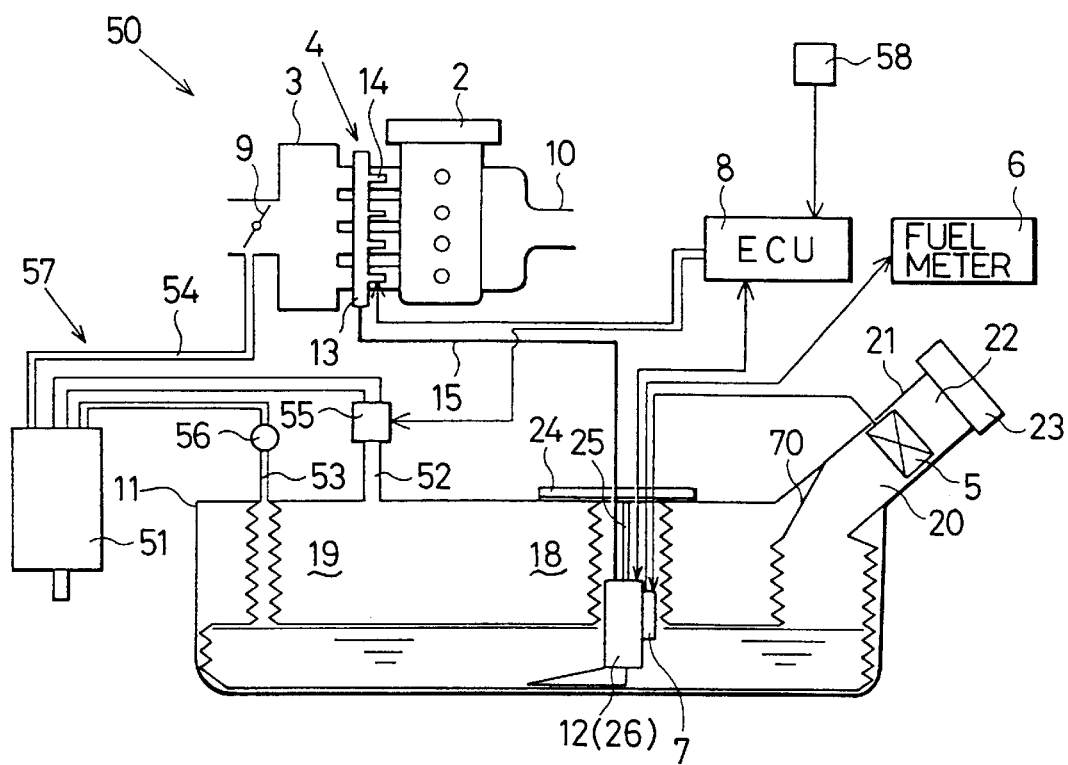
FIG. 13 is a block diagram showing an evaporated fuel treating device of the automobile (sixth embodiment)
Figure 14:
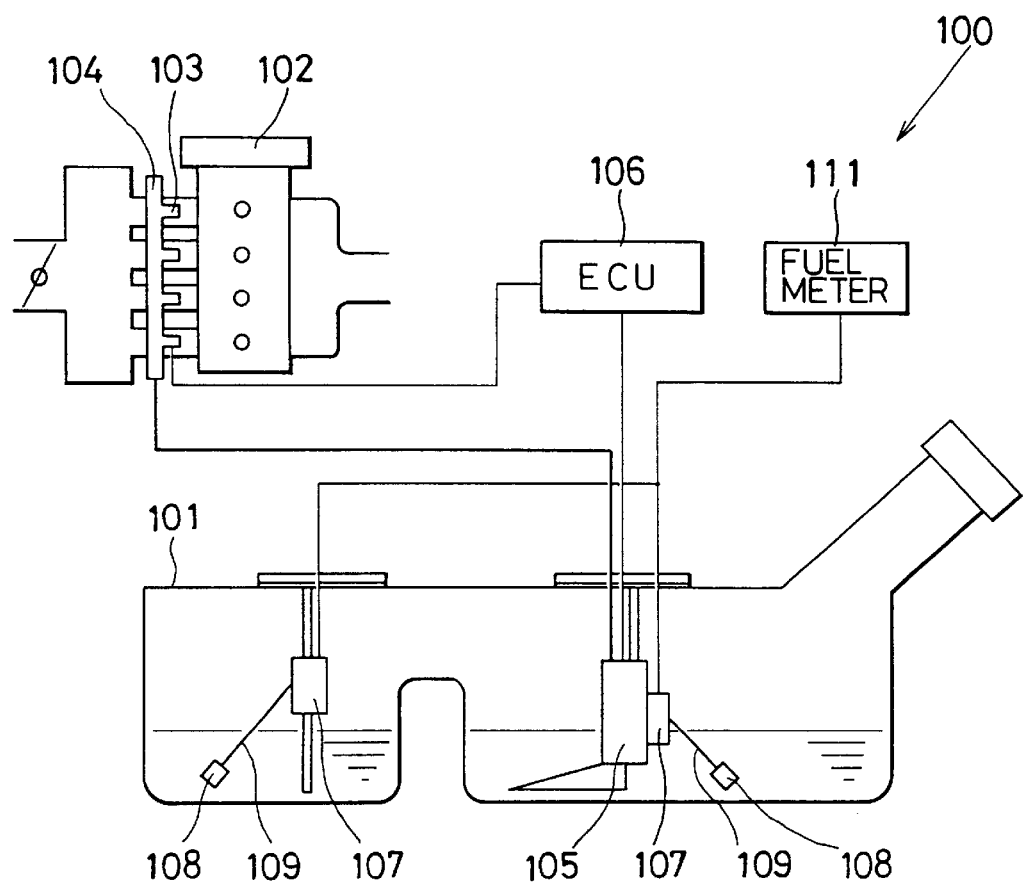
FIG. 14 is a block diagram showing the fuel supply system of the automobile (prior art).

In a sixth embodiment shown in FIG. 13, an evaporated fluid treating device 50 has a film for restraining fuel evaporation on the fuel liquid surface in the fuel tank 11.

The evaporated fuel treating device 50 of the present embodiment is fitted with a bag-shaped expansion film 70 to restrain the quantity of evaporated fuel in addition to the evaporated fuel treating device 50 of the third embodiment.

The expansion film 70 shrinks due to its shrink properties with a decrease in the fuel quantity, resulting in a decreased space volume above the fuel. With the start of fuel supply, the fuel in the expansion film 70 increases and accordingly the expansion film 70 expands with the increase in the fuel supply. At this time, as described in the third embodiment, the open/close valve 55 is opened to allow free expansion of the expansion film.

Since the fuel in the fuel tank 11 is thus covered with the expansion film 70, the quantity of evaporated fluid remaining in a space in the fuel tank 11 decreases, while the fuel section in the expansion film expands during fuel supply. Therefore, it is possible to reduce the quantity of evaporated fuel mixed with the air in the fuel tank 11 to be discharged out of the fuel tank 11.

In this system also, the quantity of residual fuel may be determined in the same manner as in the first embodiment on the basis of the quantity of fuel flow rate measured by the fuel flow rate quantity sensor 5, the injection rate of liquid fuel injected from the fuel injection valve, and the purge quantity of evaporated fuel.

Application of the residual fuel quantity measuring device to the evaporated fuel treating device provided with a film for restraining fuel evaporation enables measurements of the quantity of fuel supplied, without deteriorating the sealing properties of the expansion film, that is, without reducing the effect of the expansion film for restraining the generation of fuel vapor.

Modification

It should be noted that a sound alarm device may be used in place of a visual display for acoustically indicating the amount of liquid fuel remaining in the fuel tank 11.

Further, that the present invention may be applied to a residual fuel quantity measuring device of a diesel-powered automobile, aircraft, and vessel, and further to a residual fuel quantity measuring device of a stationary-type internal combustion engine for driving a generator for private or public use.

Furthermore, a purge control valve which operates in accordance with the operating condition of the engine 2 may be provided in the purge pipe 54. In this case, when the purge control valve is opened, evaporated fuel adsorbed in the canister 51 will be led into the intake manifold 3 of the engine 2 by the intake manifold vacuum, and is mixed with the air to be mixed with the fuel, thereby preventing emission of evaporated fuel.

Other modifications and changes may be made by those skilled in the art within the spirit of the present invention.

What is claimed is:

1. An apparatus for an internal combustion engine system having a fuel tank with a fuel supply inlet passage, the apparatus comprising:

a fuel flow rate measuring device, mounted in the fuel supply inlet passage of the fuel tank, for measuring flow rate of liquid fuel flowing through the fuel supply inlet passage and to the fuel tank;

the fuel flow rate measuring device having a turbine rotor with blades, the blades of the turbine rotor being disposed so that liquid fuel flowing through the fuel supply inlet passage is intercepted by the blades so that the blades are rotated by the fuel hitting the blades whereby the turbine rotor turns at a rotational speed in accordance with the flow rate of liquid fuel flowing through the fuel supply inlet passage, the turbine rotor being disposed so that liquid fuel flows into the turbine rotor and out from the turbine rotor in substantially a common direction, and a rotational speed detector for detecting rotational speed of the blades of the turbine rotor, for measuring the flow rate of liquid fuel supplied to the fuel tank from the detected rotational speed.

2. The apparatus according to claim 1, wherein:

the fuel flow rate measuring device has a fuel stream strainer section, mounted on an upstream side of the turbine rotor, for straining stream of liquid fuel.

3. The apparatus according to claim 2, wherein the fuel stream straining section is grid-shaped and the fuel supply inlet passage is shaped as a generally straight passage.

4. The apparatus according to claim 1, wherein:

the fuel flow rate measuring device has a fuel throttle section, mounted on the upstream side of the turbine rotor, for straining stream of liquid fuel.

5. The apparatus according to claim 1, further comprising:

an expansion film provided in the fuel tank to expand and shrink in accordance with stored amount of liquid fuel in the fuel tank, thereby reducing a space volume above the liquid fuel.

6. The apparatus according to claim 1, further comprising:

a residual fuel quantity memory for memorizing quantity of liquid fuel remaining in the fuel tank;

an injection rate computing device for computing injection rate of liquid fuel injected into the engine; and a residual fuel quantity computing device for computing the quantity of liquid fuel remaining in the fuel tank on the basis of the memorized quantity of liquid fuel, the measured fuel flow rate, and the computed injection rate of liquid fuel.

7. The apparatus according to claim 6, further comprising:

a purge quantity computing device for computing purge quantity of evaporated fuel in the fuel tank, the residual fuel quantity computing device computing the quantity of liquid fuel remaining in the fuel tank further on the basis of the computed purge quantity of evaporated fuel.

8. The apparatus according to claim 7, wherein:

the residual fuel quantity measuring device has a residual fuel quantity display device for displaying the computed residual quantity of liquid fuel.

9. The apparatus according to claim 6, wherein:
the residual fuel quantity measuring device has a residual quantity detector for detecting that the residual quantity of liquid fuel in the fuel tank has reached a predetermined residual quantity, and a residual fuel quantity correcting device for correcting the residual quantity of liquid fuel to the predetermined residual quantity when the residual quantity detector detects that the residual quantity of liquid fuel has reached the predetermined residual quantity.

10. The apparatus according to claim 1, further comprising:
a canister for adsorbing an evaporated fuel generated in the fuel tank;
a connecting tube connecting the fuel tank and the canister;
an open/close valve fitted in the connecting tube for opening and closing the connecting tube; and
a valve control device for opening the open/close valve when the flow rate measuring device detects that the liquid fuel is supplied to the fuel tank.

11. The apparatus according to claim 10, further comprising:
an expansion film provided in the fuel tank to expand and shrink in accordance with stored amount of liquid fuel in the fuel tank, thereby reducing a space volume above the liquid fuel.

12. A fuel measuring method for an internal combustion engine system having a fuel tank with a fuel supply inlet passage, the method comprising the steps of:
measuring flow rate of liquid fuel supplied into the fuel tank through the fuel supply inlet passage by a fuel flow rate measuring device having a rotor with blades mounted in the fuel supply inlet passage of the fuel tank, the blades of the turbine rotor being disposed so that liquid fuel flowing through the fuel supply inlet passage is intercepted by the blades so that the blades are rotated by the fuel hitting the blades whereby the rotor is driven by the liquid fuel, the rotor being disposed so that liquid fuel flows into the turbine rotor and out from the turbine rotor in substantially a common direction;
computing injection rate of liquid fuel injected into the engine; and
computing quantity of liquid fuel remaining in the fuel tank from the measured fuel flow rate, the computed injection rate and quantity of liquid fuel remaining before the flow rate measuring step.

13. The method according to claim 12, further comprising the steps of:
computing purge quantity of evaporated fuel in the fuel tank; and
correcting the computed quantity of liquid fuel remaining in the fuel tank by the computed purge quantity of evaporated fuel.

14. The method according to claim 13, further comprising the steps of:
purging the evaporated fuel in the fuel tank to a canister provided outside of the fuel tank when the fuel flow rate measuring device is in operation; and
maintaining the purging step for a predetermined time period irrespective of operation of the fuel flow rate measuring device.

15. The method according to claim 12, further comprising the steps of:
detecting, by a detector disposed in the fuel tank, that the liquid fuel in the fuel tank has reached a predetermined level; and
correcting the computed residual quantity of liquid fuel to a predetermined residual quantity when the detector detects that the residual quantity of liquid fuel has reached the predetermined level.

16. The method according to claim 12, further comprising the steps of:
supplying, through the fuel inlet supply passage, the liquid fuel into an expansion film bag provided in the fuel tank to store therein evaporated fuel; and
purging the evaporated fuel in the expansion film bag to a canister when the fuel flow rate measuring device is in operation.

17. An apparatus for an internal combustion engine system having a fuel tank with a fuel supply inlet passage, the apparatus comprising:
a fuel flow rate measuring device, mounted in the fuel supply inlet passage of the fuel tank, for measuring flow rate of liquid fuel passing in the fuel supply inlet passage;
the fuel flow rate measuring device having a turbine rotor with blades which turns at a rotational speed in accordance with the flow rate of liquid fuel passing in the fuel supply inlet passage, and a rotational speed detector for detecting rotational speed of the blades of the turbine rotor, for measuring the flow rate of liquid fuel supplied into the fuel tank from the detected rotational speed; and
an expansion film provided in the fuel tank to expand and shrink in accordance with stored amount of liquid fuel in the fuel tank, thereby reducing a space volume above the liquid fuel.

18. An apparatus for an internal combustion engine system having a fuel tank with a fuel supply inlet passage, the apparatus comprising:
a fuel flow rate measuring device, mounted in the fuel supply inlet passage of the fuel tank, for measuring flow rate of liquid fuel passing in the fuel supply inlet passage;
the fuel flow rate measuring device having a turbine rotor with blades which turns at a rotational speed in accordance with the flow rate of liquid fuel passing in the fuel supply inlet passage, and a rotational speed detector for detecting rotational speed of the blades of the turbine rotor, for measuring the flow rate of liquid fuel supplied into the fuel tank from the detected rotational speed;
a residual fuel quantity memory for memorizing quantity of liquid fuel remaining in the fuel tank;
an injection rate computing device for computing injection rate of liquid fuel injected into the engine; and
a residual fuel quantity computing device for computing the quantity of liquid fuel remaining in the fuel tank on the basis of the memorized quantity of liquid fuel, the measured fuel flow rate, and the computed injection rate of liquid fuel, wherein:
the residual fuel quantity measuring device has a residual quantity detector for detecting that the residual quantity of liquid fuel in the fuel tank has reached a predetermined residual quantity, and a residual fuel quantity correcting device for correcting the residual quantity of liquid fuel to the predetermined residual quantity when the residual quantity detector detects that the residual quantity of liquid fuel has reached the predetermined residual quantity.

19. An apparatus for an internal combustion engine system having a fuel tank with a fuel supply inlet passage, the apparatus comprising:

a fuel flow rate measuring device, mounted in the fuel supply inlet passage of the fuel tank, for measuring flow rate of liquid fuel passing in the fuel supply inlet passage;

the fuel flow rate measuring device having a turbine rotor with blades which turns at a rotational speed in accordance with the flow rate of liquid fuel passing in the fuel supply inlet passage, and a rotational speed detector for detecting rotational speed of the blades of the turbine rotor, for measuring the flow rate of liquid fuel supplied into the fuel tank from the detected rotational speed;

a canister for adsorbing an evaporated fuel generated in the fuel tank;

a connecting tube connecting the fuel tank and the canister;

an open/close valve fitted in the connecting tube for opening and closing the connecting tube; and a valve control device for opening the open/close valve when the flow rate measuring device detects that the liquid fuel is supplied to the fuel tank.

20. A fuel measuring method for an internal combustion engine system having a fuel tank with a fuel supply inlet passage, the method comprising the steps of:

measuring flow rate of liquid fuel supplied into the fuel tank through the fuel supply inlet passage by a fuel flow rate measuring device having a rotor mounted in the fuel supply inlet passage of the fuel tank to be driven by the liquid fuel;

computing injection rate of liquid fuel injected into the engine;

computing quantity of liquid fuel remaining in the fuel tank from the measured fuel flow rate, the computed injection rate and quantity of liquid fuel remaining before the flow rate measuring step;

detecting, by a detector disposed in the fuel tank, that the liquid fuel in the fuel tank has reached a predetermined level; and correcting the computed residual quantity of liquid fuel to a predetermined residual quantity when the detector detects that the residual quantity of liquid fuel has reached the predetermined level.

21. A fuel measuring method for an internal combustion engine system having a fuel tank with a fuel supply inlet passage, the method comprising the steps of:

measuring flow rate of liquid fuel supplied into the fuel tank through the fuel supply inlet passage by a fuel flow rate measuring device having a rotor mounted in the fuel supply inlet passage of the fuel tank to be driven by the liquid fuel;

computing injection rate of liquid fuel injected into the engine;

computing quantity of liquid fuel remaining in the fuel tank from the measured fuel flow rate, the computed injection rate and quantity of liquid fuel remaining before the flow rate measuring step;

supplying, through the fuel inlet supply passage, the liquid fuel into an expansion film bag provided in the fuel tank to store therein evaporated fuel; and purging the evaporated fuel in the expansion film bag to a canister when the fuel flow rate measuring device is in operation.

* * * * *